Feb. 2, 1926.
E. V. BATES
1,571,364
MACHINE FOR FEEDING FIBROUS MATERIAL
Filed Dec. 5, 1924
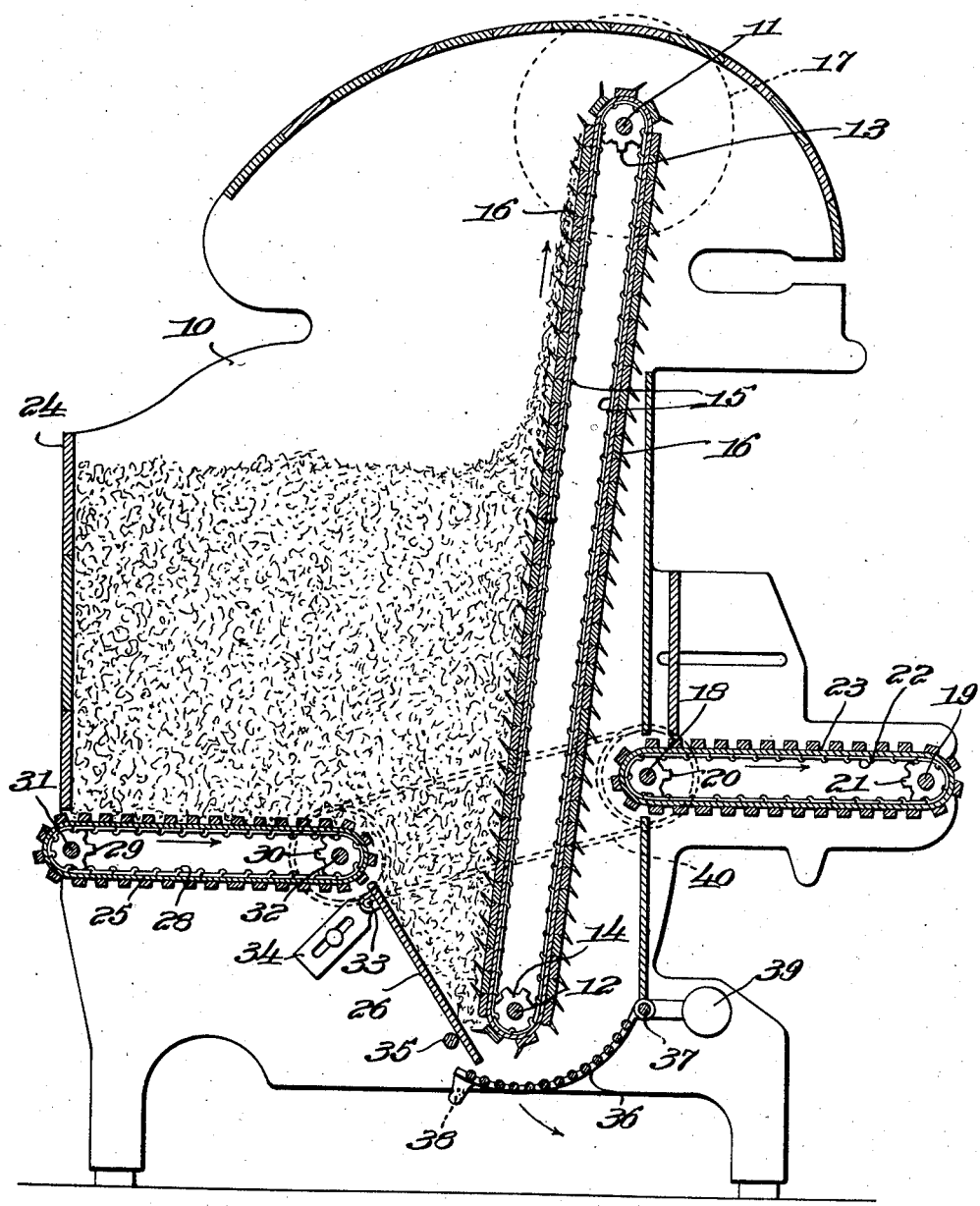

Patented Feb. 2, 1926.

1,571,364

UNITED STATES PATENT OFFICE.

EDDO V. BATES, OF LOWELL, MASSACHUSETTS.

MACHINE FOR FEEDING FIBROUS MATERIAL.

Application filed December 5, 1924. Serial No. 754,154.

*To all whom it may concern:*

Be it known that I, EDDO V. BATES, a citizen of the United States of America, and a resident of Lowell, in the county of Middlesex and Commonwealth of Massachusetts, have invented certain new and useful Improvements in Machines for Feeding Fibrous Material, of which the following is a specification.

This invention relates to feeding mechanism for carding machines and has for one of its objects the production of a feed arranged to so present the stock to the transferring apron that more accurate and uniformly timed weighings are obtained than with feeds at present in use.

It is a further object of the invention to not only ensure accurate weighings when the stock chest is approximately full, but to so present the stock to the transferring apron that accurate and uniformly timed weighings will also result up to the time the said chest is nearly empty.

A further object of the invention is to produce a feed wherein the stock is presented to the transferring apron in such manner that a more even density of stock throughout its depth is attained and kept in contact with the said apron, whereby a more even and uniformity of stock removal takes place than has been possible in feeds heretofore used.

Another object of the invention is to produce a feed wherein stock is presented to the transferring apron at approximately the same speed that the said apron picks it up, and in such manner that the said apron is relieved of undue drag thus enabling it to pick up its load with the least possible damage to the fibres of the stock.

To the attainment of the above objects, the invention consists in certain novel features of construction and arrangement of parts which will be fully understood from a description of the drawing and the claim hereinafter given.

Of the drawing:

The drawing herewith represents a vertical longitudinal section through a card feed and shows a sufficient portion of it to enable the invention to be understood.

Referring to the drawing:

The drawing shows one make of card feed to which the present invention is applicable, but it will be understood that it might be used in other makes and in fact is applicable to existing feeds, and may be adjusted thereto at but slight expense and consumption of time.

It will also be understood that changes might be made in the construction and arrangement shown in the drawing without departing from the spirit and scope of the invention.

In the present instance the frame 10, one side of which is shown herein, has mounted therein the shafts 11 and 12 carrying the sprockets 13 and 14 arranged to engage and drive the sprocket chains 15 of a transferring apron 16, the said shaft 11 being arranged to be driven by a pulley 17 which in turn may be driven from any usual or suitable source.

The shafts 18 and 19 are also suitably journalled in the frame 10 and are supplied with sprockets 20 and 21 arranged to drive the chains 22, one of which is shown, of a conveyor belt or apron 23.

So far, the devices described are or may be of any usual or suitable construction.

The frame 10, only one side of which is shown, the transferring apron 16, back plate 24, and bottom stock supporting means 25 and 26 form the stock chest.

The bottom stock supporting means comprises a belt or apron 25 driven by chains 28, only one of which is shown, engaging the sprockets 29 and 30 of the shafts 31 and 32, and the adjustable inclined board 26 shown as pivoted at 33 to brackets 34 adjustably mounted on the frame 10, its lower end resting on a conveniently positioned rod or shaft 35.

A grid 36 is provided which however is pivotally mounted on the frame at 37 and normally held in the position shown with the stop 38 abutting the frame 10, by a weight 39.

The apron 25 may be driven from any suitable source but is herein shown as receiving its power from the shaft 18 through a sprocket chain as indicated at 40.

It is intended that the apron 25 shall be driven at a speed to carry the stock toward the apron 16 as rapidly as it is taken up by it, by which arrangement the pressure of stock against the apron 16 is practically constant and results in less damage to the fibres of the stock, as unnecessary drag is not imposed upon the teeth of the said apron which would cause the teeth to tear their way through the stock rather than gently separating the said fibres from the mass in an unbroken condition.

The apron 25 is so positioned and arranged as to sustain the bulk of the weight of the stock in the chest, gradually moving it toward the apron 16 to replenish stock removed thereby, finally delivering it in a progressive column to the pocket formed in part by the board 26, down which it travels by the force of gravity at a speed equal to the removal of stock by the said apron 16 anad the speed of the apron 25. By this arrangement it will be readily seen that the stock which may have attained a certain compactness or density while being carried by the apron 25 will be relieved of its compactness when it reaches the pocket and will assume a more even density throughout the height of the column because of the upward drag imposed upon it by the teeth of the apron 16 and the action of gravity which gradually but effectively relieves the stock adjacent the apron 25 of its attained compactness, and by reason of the steady and regular advance of the stock towards the apron 16 a uniform pressure and density of the stock is attained which results in more even distribution of stock on the apron 16 and more regular and accurate weighings with much less damage to the fibre than has been possible in feeds heretofore used.

The grid 36 is arranged to catch any stock that might otherwise drop to the floor, and is mounted in a tiltable manner whereby it may be downwardly swung to clear it of any foreign matter that might accumulate thereon.

It is known that bottom stock supports such as the apron 25 have been used in feeds of this class, and that inclined back plates have been used to direct the stock downwardly and toward the transferring apron, but in each instance the weighings were irregular and consequently real satisfactory feed was not obtained.

So far as is known it is new in the art to use a bottom support for the stock comprising the combination of a travelling apron such as 25 which delivers the stock to a pocket, formed in part by an incline such as the board 26, at which place the stock will automatically regulate its own density or compactness just prior to being taken up by the teeth of the transferring apron 16, and an incline of any sort whether moving or stationary.

In view of the above it will be understood that it is not the intention to limit the invention to the precise construction and arrangement shown as it is possible to make changes therein without departing from its spirit and scope.

Having described the invention, I claim:

A machine for feeding fibrous material having a stock chest the bottom of which comprises an endless apron arranged to provide a relatively shallow portion of said chest and to support the major portion of the stock therein and move it towards a transferring apron in said chest, and a downwardly and rearwardly extending member arranged to receive stock from said endless apron and direct it into a pocket formed in part by said member; means to adjust the angularity of said member; a transferring apron in said chest arranged to remove stock directed towards it by said endless apron and said member; and means to drive said endless apron.

Signed by me at Lowell, Massachusetts, this 29th day of November, 1924.

EDDO V. BATES.